United States Patent [19]

Taylor

[11] 4,120,794

[45] Oct. 17, 1978

[54] FILTER CARTRIDGE ASSEMBLY

[75] Inventor: Bruce George Taylor, Kensington, Conn.

[73] Assignee: AMF Incorporated, White Plains, N.Y.

[21] Appl. No.: 783,231

[22] Filed: Mar. 31, 1977

[51] Int. Cl.² .................. B01D 25/18; B01D 27/00
[52] U.S. Cl. ................. 210/345; 210/440; 210/450; 210/453; 210/491; 210/497 R
[58] Field of Search ............... 210/323 T, 345, 347, 210/352, 440, 443, 444, 450, 451, 453, 488, 491, 497 R, 497 FB, 506, 507, 508, 509

[56] References Cited

U.S. PATENT DOCUMENTS

| 915,650 | 3/1909 | Anderson | 210/443 X |
|---|---|---|---|
| 2,354,380 | 7/1944 | Kasten | 210/443 X |
| 2,382,278 | 8/1945 | Widmann | 210/443 |
| 3,141,845 | 7/1964 | Nadherny | 210/488 X |
| 3,152,988 | 10/1964 | Gutkowski et al. | 210/486 |
| 3,294,241 | 12/1966 | Sicard et al. | 210/347 X |
| 3,387,711 | 6/1968 | Rickert | 210/345 |
| 3,536,200 | 10/1970 | Gigliotti et al. | 210/345 |
| 3,537,592 | 11/1970 | Ogden et al. | 210/347 X |

FOREIGN PATENT DOCUMENTS 599,089 10/1959 Italy ........................... 210/345

Primary Examiner—Robert H. Spitzer
Attorney, Agent, or Firm—George W. Price; Charles J. Worth

[57] ABSTRACT

A filter cartridge assembly is formed of a series of stacked disc members interlocking with one another and held in compression by a preload force exerted through respective end members at opposite ends of the assembly. Each of the disc members is provided with a series of raised surfaces — bosses, for positioning filter media thereon and providing fluid flow paths for the filtrate to pass through openings in the disc members into a central passage and out of the cartridge. Cooperating raised edge surfaces adjacent to the outer and inner periphery, engage and seal the filter media under a compressive load along the surfaces adjacent the outer and inner edges of the media, when the respective disc members are in stacked relationship and the media is sandwiched between neighboring discs.

12 Claims, 8 Drawing Figures

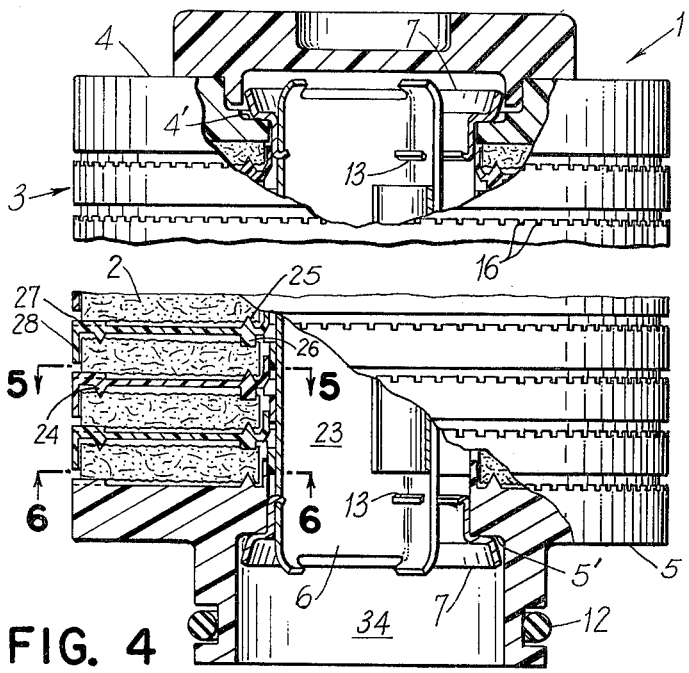
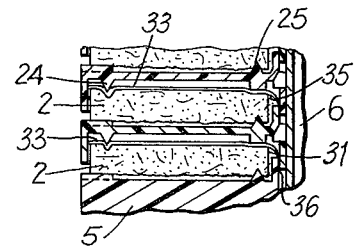
FIG. 4
FIG. 8
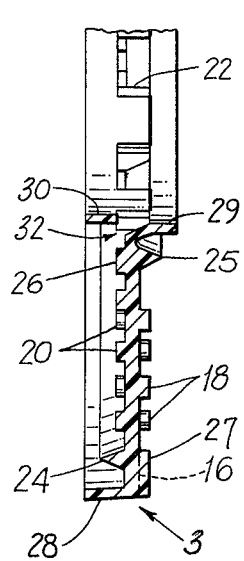
FIG. 7
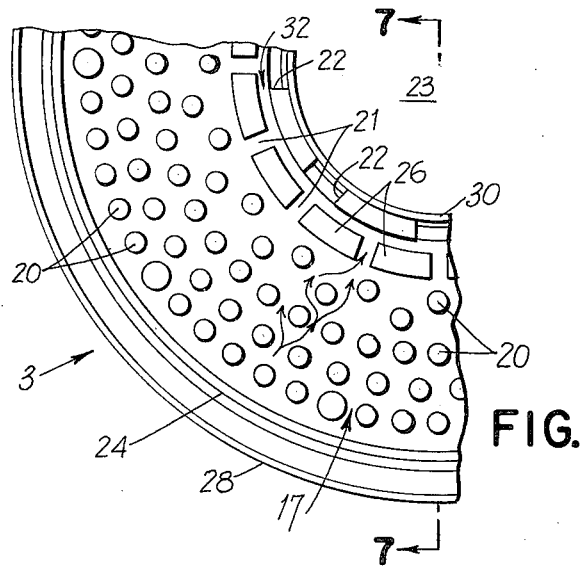
FIG. 6
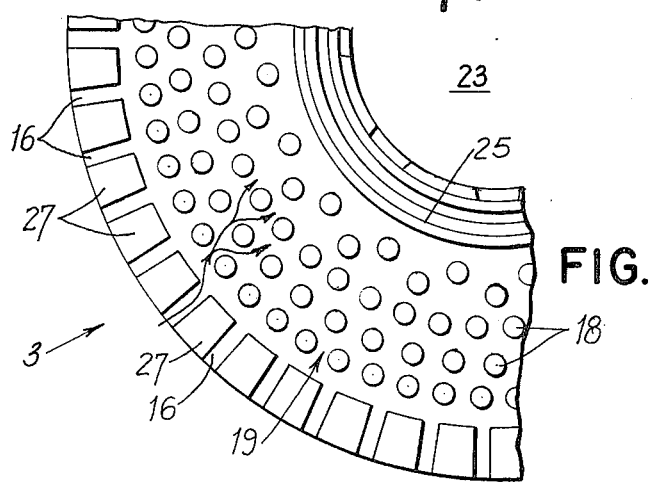
FIG. 5

FILTER CARTRIDGE ASSEMBLY

BACKGROUND OF INVENTION

The present invention is directed to a filter cartridge assembly. More particularly, to a filter cartridge assembly employing an extended filter area which may be varied in accordance with the deposition of filter cartridge elements employed in the formation of the total cartridge assembly.

In developing filter cartridge assemblies having extended filter areas, problems arise when the filter media employed are relatively thick, since they are not easily formable. Attempts to form or bend such filter media normally have produced a tendency to degrade the filter fiber structure, thus reducing the total effectiveness of the filter cartridge.

Usually in constructing cartridges of the type where there is forming or bending, adhesives necessitating appropriate setting are required, which in turn tend to increase the complexity associated with the manufacture of the end product.

Furthermore, when using such adhesives there is a tendency at times for the process fluid being treated to in some fashion extract the adhesive components and produce unwanted contamination.

The present invention employs a number of design and structural criteria for producing a filter cartridge having an extended filter area without having any of the disadvantages usually associated with filter media which are not readily formable.

SUMMARY OF THE INVENTION

Accordingly, it is the main object of the present invention to overcome the defects of the prior art. Still another object of the present invention is to provide a basic structural member for positioning filter media in stacked relationship with one another, so as to provide an end product which can be readily manufactured and used in a broad number of applications where extended filter media areas are required.

Still a further object of the present invention is to provide a filter cartridge assembly employing relatively thick and compressible media for entrapping contaminants passing through the media, where the media edges are protected against flow errosion by flanges disposed in the central portion of disc.

Other objects and advantages of the present invention will be more definitely understood with respect to the accompanying specification, claims and drawings.

The principal features of the present invention are directed to a filter cartridge assembly employing base means at a first end, closure means having a fluid outlet port at a second opposite end and filter media in the form of a series of individual filtration elements serially disposed between said base means and said closure means to define a total effective filtration area. Disc shaped filter media receptacles cooperate with said filtration elements to position each of said filtration elements between adjacent receptacle means. Each receptacle means being further defined by downstream and upstream operative surfaces, which cooperate with opposite surfaces of adjacent receptacle means and filtration elements disposed therebetween. The filtration elements are each respectively disposed upon said downstream surface within an area defined by first and second concentrically spaced flange means formed on said downstream surface. An orifice means is centrally formed of said receptacle means and a plurality of passage ways formed on said downstream and upstream surfaces conduct fluid flow to said orifice means. A first sealing means formed on said downstream surface concentrically spaced with respect to said first flange means co-acts with said filtration element. Spaced abutment means serially disposed about said orifice means in proximity to said second flange means radial fluid flow passage means leading into individual orifices extending into said central orifice means, for directing fluid flow out of said cartridge assembly and through said outlet port in said closure means. Fluid inlet passage means at the outer edge of said receptacle means are formed between spaced abutment means on said upstream surface. A third flange means extending away from said upstream surface is formed about said central orifice means, said third flange means being engagable with second flange means of an adjacent receptacle means, whereby serial filtration elements are each fixedly positioned between respective downstream and upstream surfaces of said adjacent receptacle means. A second sealing means is concentrically spaced from said third flange means formed on said upstream surface. Positioning means adapted to be disposed within said orifice means for positioning respective receptacle means and filtration elements in stacked aligned relationship with respect to one another extends between said base means and said closure means is fixedly engagable with said closure means under a compressive load for urging each of said filtration elements to seal at the points of contact with said first and second sealing means to isolate said downstream and upstream fluid flow passage ways.

Also, within the scope of the invention is a liner disposed on the downstream side between the filtration elements and the receptacle means for positioning the media. The inner edge of the liner is engaged between co-acting surfaces of adjacent receptacle means to prevent by filtration element particles to the downstream side.

IN THE DRAWINGS

FIG. 4 is a partial front elevational view in cross section illustrating the present invention.

FIG. 5 is a fragmented partial plan view of the separator disc of the present invention in the upstream side, along line 5—5 of FIG. 4.

FIG. 6 is a similar view to that of FIG. 5 in the downstream side, along line 6—6 of FIG. 4.

FIG. 7 is a side elevational view in partial cross section taken along line 7—7 of FIG. 6.

FIG. 8 is an enlarged detailed fragmentary view of FIG. 4 illustrating a modification of the invention.

DESCRIPTION OF PREFERRED EMBODIMENT

Figure 1:
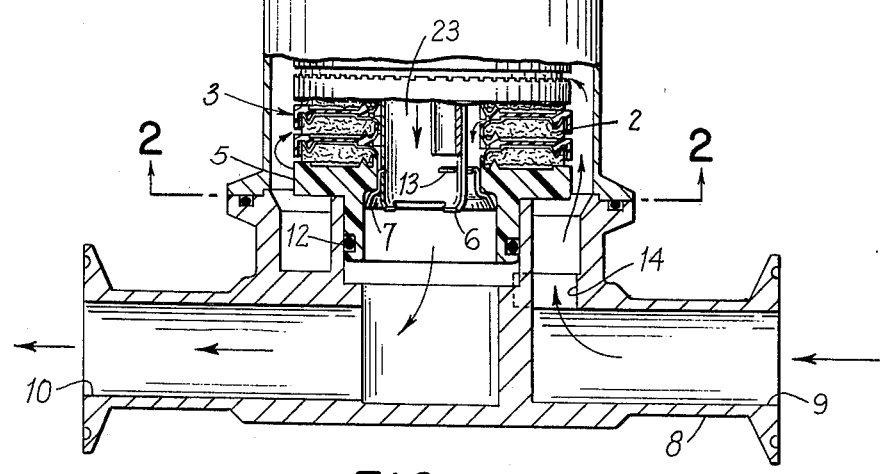
FIG. 1 is a front elevational view in partial cross section illustrating the filter cartridge assembly of the invention in a suitable filter cartridge housing.

As shown in FIG. 1, the cartridge 1 consists of a repeating arrangement of filter media 2 and separator discs 3 contained between a closure cover 4 and a connector 5 and positioned about a center post 6. The underside of the connector 5 has a surface configuration identical to that of an upstream surface of the separator disc 3 and cooperates with an adjacent disc 3 upon media 2 disposed therebetween, in a manner as set forth herein below. The connector 5 and closure cover 4 are each provided with a retaining ring 7 for engaging the center post 6 at designated points at opposite ends of its length with the filter media 2 and separator discs 3 positioned therebetween. The center post 6 is selected of a suitable length for positioning a given number of media 2 and separator discs 3 in accordance with predefined cartridge assembly design criteria. The cartridge of the invention is normally used with a filter housing 8 having an inlet port 9 and an outlet port 10. The housing in the filter assembly shown in FIG. 1 also includes a spring member 11 which acts to provide an end force on the cartridge 1 at closure cover 4 in order to insure constant engagement of "0" ring 12 with the housing 8 at the outlet port 10.

Figure 2:
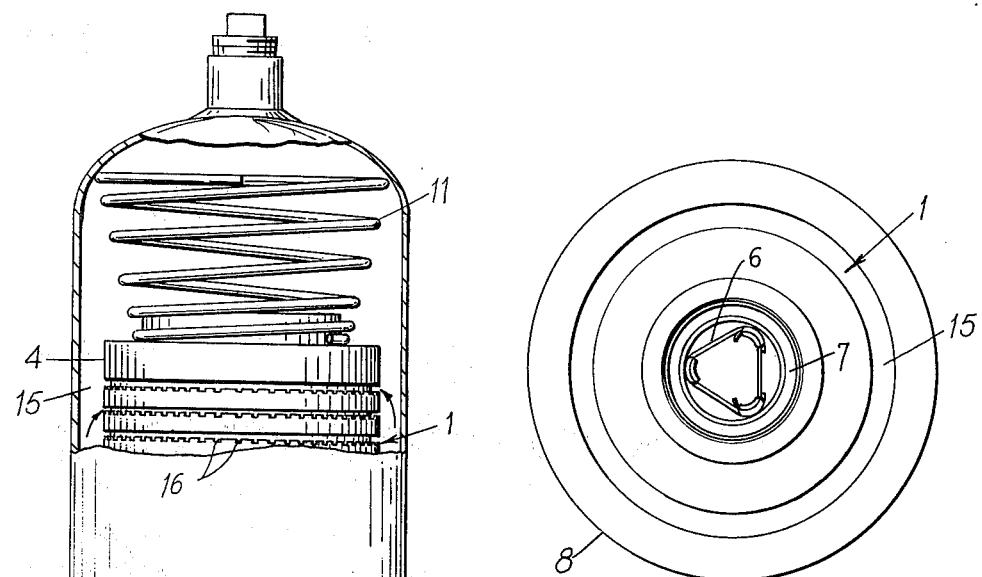
FIG. 2 is a plan view of the filter cartridge assembly of FIG. 1 taken along line 2—2.
Figure 3:
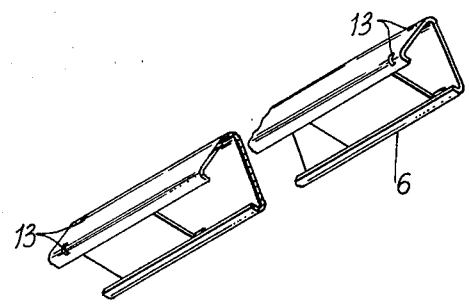
FIG. 3 is a broken perspective view of the center post used in the invention.

During the assembly of the cartridge 1, a given number of separator discs 3 and associated filter media 2 are stacked in alternate relationship about the center post 6 of a predefined length. The center post 6 is provided with individual sets of slots 13 at opposite ends thereof. Two retaining rings 7 are each seated respectively into recess 4' formed in closure 4 and recess 5' formed in connector 5, with a force fit occurring by the locking action of the slots 13 and lower edges of the associated retaining rings 7. After a sufficient number of discs 3 and filter media 2 are stacked about the center post 6 positioned in closure 4, connector 5 and retaining ring 7 are positioned at the top of the stack. The stack is provided with a sufficient number of discs 3 and media 2 so that an effective filtration area exists in accordance with design requirements. Throughout this operation, the entire assembly is held in place and oriented by appropriate fixturing. Next, the stack is subjected to compressive load by means of a commercially available press and is continuously compressed to the point where retaining ring 7 first engages center post 6 and then locks into slots 13 of center post 6 (see FIG. 4). FIG. 3 illustrates the center post 6 with a central brace member and slots 13 in detail. At this point in time, the filter cartridge 1 is formed.

It should be pointed out that proper sealing between adjacent filter media 2 and separator disc 3 is assured by reason of the aforementioned loading through the compression of the discs 3 and media 2 between closure cover 4 and connector 5 about the center post 6.

The appropriate number of filter media 2 and associated discs 3 for a given center post length is determined by empirical means. The filter media 2 is cut from sheet material in a disc shape to fit the separator discs 3. The media is relatively thick and compressible, consistng of randomly laid fibers. For example, in manufacturing a filter cartridge 1 having an effective filtering area of 164.5 square inches being about 10.25" long, the media employed has an outside diameter of 2.765" and an inside diameter of 1.047", forty-two sets of discs 3 and employ media 2 consisting of formulations of cellulose and diatomaceous material such as, for example, ZETA PLUS 50C manufactured by the CUNO Division, AMF Corp., shown and described in a booklet entitled "ZETA PLUS SERIES FILTER MEDIA" published in 1975 by AMF Corporation. A center post 6 which has a length of 9.25 inches as measured between the opposite retaining edges of slots is used and during compression, and a minimum of 600 lbs. of force is required to insure proper sealing between the media 2 and adjacent separator discs 3.

As shown in FIG. 1 and 4, fluid to be treated enters inlet 9 and travels through orifice 14 into the space 15 formed between filter housing 8 and cartridge 1. As fluid enters into spaced slots 16 formed about the periphery of the separator discs 3 it passes into passage ways 19 formed by a plurality of spaced bosses 18 (see FIG. 5) and then proceeds into the filter media 2 where filtration takes place. The cleaned filtered fluid passing from the downstream side of the filter media 2 travels into passage ways 17 formed by bosses 20 (see FIG. 6) on the underside of the discs 3. Thereafter, the cleaned fluid passes into a series of radially disposed slots 21 formed integrally of disc 3 out through centrally formed orifices 22 for passage through centrally formed orifices 22 for passage through the the central orifice 23 to a central passage 34 in connector 5 for discharge of fluid through the outlet 10 of housing 8. The disc 3 immediately adjacent to closure 4 is rendered inoperative by the absence of orifices 22 leading to central orifice 23. This specific disc 3 and associated media 2 do not enter into the determination of total filtration media area. Any flow passing through this disc and mdia although filtered is of a negligible quantity.

Under the compressive load, the filter media 2 is sandwiched between adjacent discs 3, whereby, the upstream side of the media 2 is isolated from the downstream side, by sealing action resulting impingement of raised edge surfaces 24-25 on the opposite sides of the disc 3. Raised surface 24 impinges upon the media in proximity to its outer edge and raised surface 25 impinges the media 2 underneath near the media inner edge 31. Impingement by raised surface 25 prevents the unfiltered fluid from bypassing media 2. Raised pads 26 are provided as a support for the media 2 and are disposed directly opposite the raised surface 25, so that during the application of the compressive load, media 2 is supported and properly sealed between raised surface 25 and pad 26. A flow path 32 formed between raised pads 26 and flange 30 serves to direct fluid from slots 21 to orifices 22. Likewise, for the same reason i.e. support for the media producing proper sealing, surface 24 is disposed directly opposite raised pads 27.

Separator discs 3 are each provided with an outer flange 28 located on the downstream side to provide a protective outer surface about the outer edge of the media 2. Another flange 29 disposed on the upstream side of the disc 3 engages flange 30 formed on the downstream side of an adjacent disc 3, and serves to enclose the raw cut inner edge 31 of media 2 to prevent media errosion caused by flow impingement through central cartridge orifice 23.

As has been explained hereinabove, the separator discs 3 serve the important functions of: acting as a holder for the filter media 2; conducting the process fluid to the media 2 and from the via passage ways to the central cartridge orifice 23; and to provide the required seals via raised surfaces 24, 25 and associated pads 26, 27 so as to prevent passage of contaminents.

ALTERNATE EMBODIMENT OF THE INVENTION

In certain critical applications, where media migration due to fluid flow impingement is to be kept at a minimum, a liner 33 may be disposed on the downstream side of the media 2 and the separator disc 3 (see FIG. 8 for details). The liner is formed of a relatively thin, (for example, about 0.008" thick), formable fibrous plastic sheet material of high density polyethylene fibers and is cut to fit and be held by disc 3. The inner edge of liner 33 is pinched between engaging surfaces 26 of adjacent discs. Filtered fluid is prevented from reaching centrally disposed orifices 22 except by passage through the liner 33, resulting in entrapment of any migrating filter media particles.

It will be understood that the specific embodiments of the invention described herein are given by way of illustration only and that various departures may be made therefrom, all within the scope of the invention. The specific relationships of the cartridge assembly are cited merely to illustrate the efficiency of the cartridge assembly.

What I claim:

1. A filter cartridge assembly employing base means at a first end and closure means having a fluid output port at a second opposite end, filter media in the form of a series of individual filtration elements serially disposed between said base means and said closure means, cooperating with one another to define a total effective filtration area, said cartridge assembly including: disc shaped filter media receptacle means for positioning each of said filtration elements between adjacent receptacle means; said receptacle means being further defined by oppositely disposed downstream and upstream fluid flow surfaces, each of said surfaces cooperating with respective opposite surfaces of adjacent receptacle means and filtration elements disposed therebetween, said filtration elements each respectively disposed with an area defined by first and second concentrically spaced flange means formed on said downstream surface; orifice means centrally formed of said receptacle means; a plurality of passage ways formed on said downstream and upstream surfaces for fluid flow to said orifice means; first sealing means formed on said downstream surface concentrically spaced with respect to said first flange means for co-action with said filtration elements; spaced abutments serially disposed about said orifice means in proximity to said second flange means, said abutment means forming radial fluid flow passage means leading into individual orifices extending into said central orifice means, for directing fluid flow out of said cartridge assembly and through said output port in said closure means; fluid inlet passage means at the outer edge of said receptacle means being formed between spaced abutment means on said upstream surface; third flange means extending away from said upstream surface formed about said central orifice means, said third flange means being engagable with second flange means of an adjacent receptacle means to interlock said receptacle means, whereby each of said filtration elements are fixedly positioned between respective downstream and upstream surfaces of adjacent receptacle means; second sealing means concentrically spaced from said third flange means formed on said upstream surface; positioning means adapted to be disposed within said orifice means for positioning respective receptacle means and filtration elements in stacked aligned relationship with respect to one another, said positioning means extending between said base means and said closure means being fixedly engagable with said closure means under a compressive load for urging each of said filtration elements to seal at the points of contact with said first and second sealing means of said receptacle means to isolate said downstream and upstream fluid flow passage ways.

2. A filter cartridge assembly as claimed in claim 1, wherein: said downstream and upstream operative surfaces each have a plurality of raised spaced bosses forming passage ways for fluid flow to said orifice means.

3. A filter cartridge assembly as claimed in claim 2, wherein: said radial fluid flow passage means are adapted to direct fluid flow from said passage ways formed by said bosses on said downstream surface, to said individual orifices formed of said receptacle means being disposed below the said downstream surface and integral with said second flange means.

4. A filter cartridge assembly as claimed in claim 1, wherein: said first flange means being formed about the outer periphery of said receptacle means outer surface and second raised flange means extending normally to and away from said downstream surface is formed about said central orifice means.

5. A filter cartridge assembly as claimed in claim 1, wherein: said fluid inlet passage means formed between said spaced abutments on said upstream surface are disposed directly beneath said second flange means.

6. A filter cartridge assembly as claimed in claim 1, wherein: said first sealing means being defined by ridge surface means adjacent the outer periphery of said receptacle means and said second sealing means being defined by ridge surface means adjacent said third flange means; each of said respective ridge surface means being adapted to independently co-act with respective filtration elements through adjacent receptacle means, to provide sealing at the points of contact between said filtration elements and receptacle means.

7. A filter cartridge assembly as claimed in claim 6, wherein: said abutment means on the downstream and upstream surfaces of said receptacle means are respectively disposed directly beneath and opposite to each of said ridge surface means, sealing between said filtration elements and receptacle means occurring by impingement of each ridge surface means upon said filtration elements in cooperation with associated abutment means disposed to co-act with said ridge surface means.

8. A filter cartridge assembly as claimed in claim 1, wherein: each of said filtration elements being sandwiched between a respective downstream surface of a first receptacle means and a respective upstream surface of a second receptacle means, whereby fluid to be filtered entering through said fluid inlet means on said upstream surface of said second receptacle means passes through passage means formed by bosses on said upstream surface of said second receptacle means through said filtration elements to passage means formed by bosses on said downstream surfaces of said first receptacle means and through orifice means of said first receptacle means leading into central orifice means and out of said cartridge assembly.

9. A filter cartridge assembly as claimed in claim 1, wherein: said positioning means being defined by an elongated member having a locking element at each end for cooperation with said base means and said closure means; said base means and said closure means having engaging means for engaging said positioning means at opposite ends, said positioning means being disposed within said orifice means formed by the plurality of receptacle means in stacked array.

10. A filter cartridge assembly as claimed in claim 9, wherein: said positioning means being adapted to respectively lock with said base means and said closure means, as said receptacle means are in stacked array and placed under a compressive load of a predefined magnitude.

11. A filter cartridge assembly as claimed in claim 1, wherein: supplemental filtration element means are disposed between said downstream surface of said receptacle means and said filtration element means.

12. A filter cartridge assembly as claimed in claim 11, wherein: said supplemental filtration element means being in the form of a liner whose inner edge is engaged by co-acting surfaces of adjacent receptacle means.

* * * * *